Patented Aug. 25, 1925.

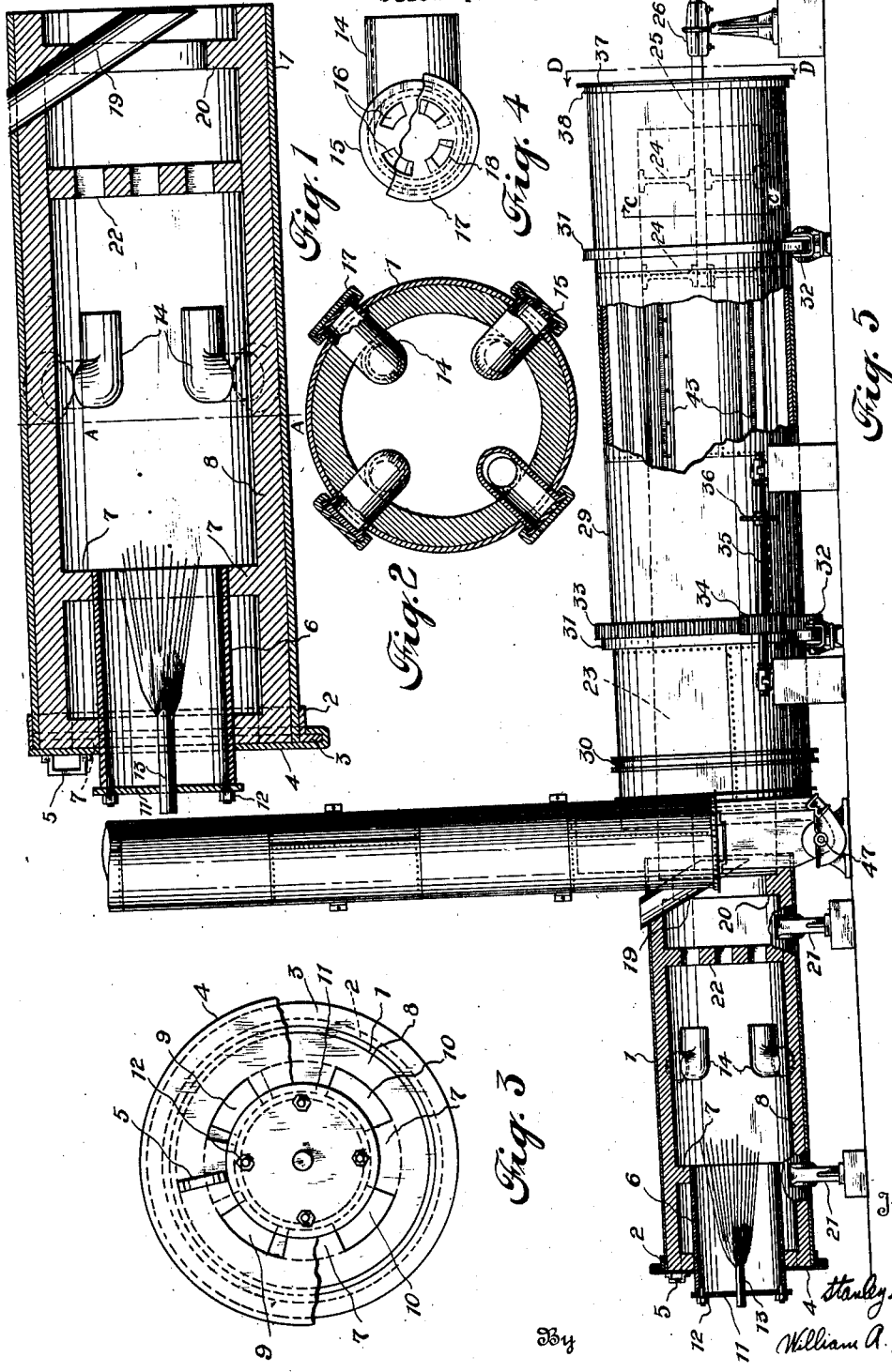

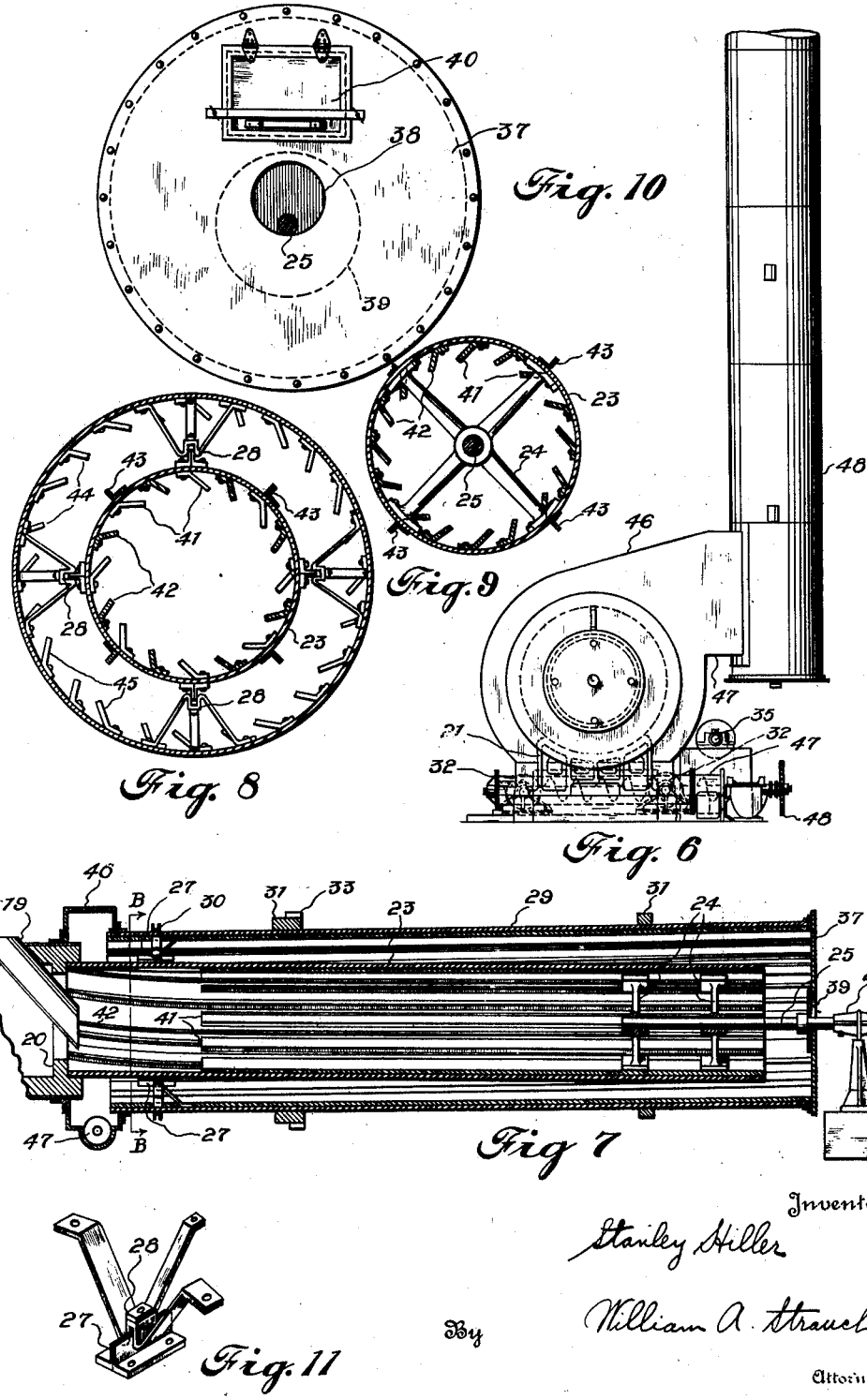

1,551,196

UNITED STATES PATENT OFFICE.

STANLEY HILLER, OF SAN JOSE, CALIFORNIA.

DRYING APPARATUS.

Application filed April 4, 1924. Serial No. 704,198.

*To all whom it may concern:*

Be it known that I, STANLEY HILLER, a citizen of the United States, residing at San Jose, in the county of Santa Clara and State of California, have invented certain new and useful Improvements in Drying Apparatus, of which the following is a specification.

The present invention relates to processes of and apparatus for drying or dehydrating organic materials, diatomaceous earth, fuller's earth, sand and other materials, and is particularly useful for rapid drying of any material containing a high percentage of moisture.

More particularly the invention relates to processes and apparatus for rapidly and efficiently drying materials in direct contact with products of combustion which may be carried out and operated in such manner that the materials are untainted by burning or by condensation of burnt products of combustion where such operation is desired, as in the treatment of organic materials. The present improvements are particularly adapted for use with the continuous plant for producing meal disclosed in copending application, Serial Number 637,285, filed May 7, 1923, but are not limited to use in this relation.

In plants for the treatment of materials to produce meal, the quality and quantity of the meal produced depends to a large extent on the drying operation, and when an effort is made to dry such materials with dryers of known types in direct contact with the products of combustion, it is found that contamination of the meal occurs, rendering it unfit for food, and that a large portion of meal is lost due to burning thereof and to fine particles being carried off with the draft. It has been discovered, however, that by properly proportioning the combustion chamber and controlling the draft, as hereinafter set forth, it is possible to cause such complete combustion of the fuel as to avoid all taint of the material due to condensation, and to supply large volumes of heated air and regulate the draft so that taint and loss by burning of particles will be substantially avoided. When treating proper materials, in accordance with the present invention, the dried product has been made of sufficiently high grade to be converted into food for human beings.

It is further found in operation of plants utilizing dryers contacting fine materials with the products of combustion, the quantity of material escaping in the draft is such as to constitute an objectionable nuisance in the immediate vicinity in the form of dust. When producing meal from organic materials, in addition to the dust, the material spreads over the neighborhood and becomes decomposed in time. In certain localities such as on fishing boats operating at sea to reduce fish waste or fish to meal, these nuisances may be unobjectionable with my improved dryer, but in certain land installations, for example in the vicinity of canneries or residences, the elimination of the nuisances becomes highly important. Special means are therefore provided for the salvage of waste and simultaneous elimination of the nuisance, to be used in connection with the improved drying apparatus where desired.

Because the drying operation, to continuously produce the required high and uniform quality of product, depends intimately upon the combustion chamber and furnace construction and arrangement, it is essential that the combustion chamber and furnace when erected shall bear definite relations in proportions and arrangements, to the remaining dryer structure. If the usual costly and unsatisfactory procedure of building up the furnace and combustion chamber by masonry when the dryer parts are in place is followed, variations in proportions, air openings and the like result which materially affect the efficiency and satisfactory operation of the dryer; and the quality of the product. Accordingly a special form of standardized portable combustion chamber has been provided in which the entire chamber is precast or built with proper provisions for draft openings, regulating devices and burner arrangements so the entire chamber can be simply set into place, and bodily removed when desired to new locations. A further advantage of this construction is the lower cost of manufacture due to the introduction of standardized manufacturing methods.

A further object of the invention is the provision of a new and improved dryer drum, and lifter arrangements whereby more rapid, economical and efficient drying of materials is attained.

Still another object of the invention is the provision of a dryer arrangement in which relatively large volumes of air are mixed with the gases of combustion to increase the volume and decrease the temperatures of the heated gases passing through the dryer.

Other objects of the invention are such as may be realized by utilization of the various combinations, subcombinations, and process steps hereinafter set forth and claimed.

Referring to the drawings—

Fig. 1 is a longitudinal sectional view through the improved combustion chamber.

Fig. 2 is a section taken along line A A of Fig. 1.

Fig. 3 is an end view of the combustion chamber with parts broken away to show the end air ports.

Fig. 4 is a detailed view of a central air inlet for the combustion chamber.

Fig. 5 is a side elevation of the assembled dryer, partially in section and with parts broken away.

Fig. 6 is a front elevation of the assembled dryer.

Fig. 7 is a longitudinal sectional view through a preferred arrangement of dryer drums.

Fig. 8 is a section taken along line B B of Fig. 7.

Fig. 9 is a sectional view taken along line C C of Fig. 5.

Fig. 10 is a sectional end view of the dryer taken along line D D of Figure 5 looking in the direction of the arrows.

Fig. 11 is a detail view showing the drive connection between the inner and outer dryer drum.

Figure 13:
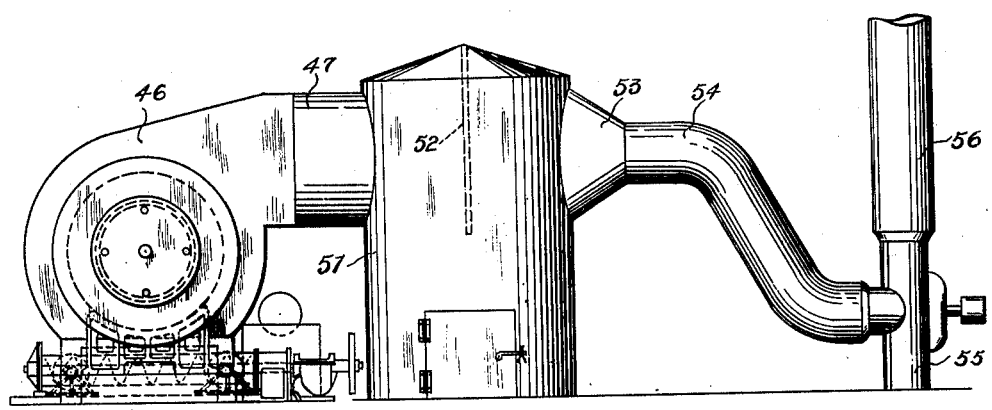
Fig. 13 is a more or less diagrammatic view showing an arrangement for recovering meal from the gases and a mechanical draft arrangement.

The combustion chamber comprises a metallic cylinder 1, cast or otherwise formed into the shape shown. Secured to the end of cylinder 1 is a ring 2 having a circular projecting flange 3 formed integrally therewith. A rotatable end cover 4 is provided with a handle 5 and the outer edge thereof is bent to form a retaining bearing on flange 3. Through a central opening in cover 4 a sheet metal or cast cylinder 6 extends which may be suitably lined if desired. Cylinder 6 is fixed in position by projecting sections 7 of a fire brick concrete lining 8 which is poured into position in the external shell or cylinder 1. Cover 4 bears rotatably on the central cylinder 6 and has openings 9 formed therein. Between the projections 7 of the lining 8, air openings 10 are formed. The openings 9 and 10 are proportioned and arranged so that cover plate 4 may be rotated to bring openings 9 into registration with openings 10, or the metal between the openings 9 may be shifted completely to cover openings 10, giving a maximum range of air control through ports 10. An end cover plate 11 is bolted to cylinder 6 by bolts 12 and serves as a removable man-hole cover for entry into the combustion chamber of the furnace. An opening is provided in the center of 11, through which a fuel supply pipe and burner nozzle 13 is inserted. If desired to give more complete control of the temperature and volume of gases passing into the dryer, a plurality of air ports 14 may be secured to and extended into the combustion chamber in such manner that the draft through the chamber will create a suction to draw air into the chamber therethrough. Each port 14, when used, is provided with an external end flange 15 having openings 16 formed therein, and a rotatable end cover plate 17 with openings 18 fits over flange 15. The arrangement of flanges 15 and cover plates 17 is such that by adjustment of 17, openings 16 may be completely sealed or opened any desired degree up to full width. A dryer feed chute 19 extends diagonally through the end of the combustion chamber and is arranged to drop the material into a dryer cylinder or drum, in back of a protecting ring 20 of material preferably cast with the coating or lining 8. It will be understood that the usual form of fire door and draft opening may be substituted for ports 10 and ports 14 may be added, using the long combustion and mixing chamber arrangement described, to produce the desired effects, but the form shown is more efficient. It will also be understood that the use of ports 14 in the form shown is a matter of choice and the entire regulation may be effected through ports 10. Supporting castings or feet 21 are secured to the cylinder 1. The parts so far described, are preferably assembled in the course of manufacture, and the chamber may be shipped complete to the place where the plant is to be installed. It will be noted that all the parts are substantially cylindrical, and lend themselves to standardized manufacture, effecting a great economy in the cost of manufacture and installation, in addition to the advantage of giving absolute control over the draft regulation and the other advantages hereinbefore pointed out.

When the combustion chamber is installed, a checkerwork wall 22 of loose fire brick may be built up as shown to effect thorough mixing of the air and heated gases of combustion, but in many instances it is found that owing to the construction of the chamber, this wall adds little to the arrangement. Where, however, the flame from the fuel tends to shoot into the dryer, this wall is advantageous.

The preferred form of dryer comprises an inner cylinder 23 the upper end of which fits into the end of the combustion chamber and is protected by wall 20 (Fig. 7). Cylinder 23 is preferably given a downward pitch from the combustion chamber to the right in Figs. 5 and 7, and is supported at its lower end by spiders 24 rigidly secured to the inner surface thereof, and secured to a shaft 25 which in turn is rotatably supported in a bearing 26. Near its upper end, cylinder 23 has secured to the outer surface thereof a plurality of short angle iron sections 27 which are slidably carried in special support and drive members 28. Members 28 are rigidly secured to cylinder 29. A bracing ring 30 for cylinder 29 is provided as reinforcement against the operating stresses due to supports 28. Cylinder 29 is rotatably supported through tires 31 on roller thrust bearings 32 in a manner to incline from the right of Figs. 5 and 7 to the left thereof, and is driven through a spur gear 33, pinion 34, shaft 35, and sprocket 36, or in any other suitable manner. At the right or high end of cylinder 29, an end plate 37 is suitably secured. In the center of plate 37 an opening 38 is cut for shaft 25 to permit free rotation of cylinders 23 and 29 at their respective and fixed inclinations. Secured to shaft 25 is a plate 39 arranged at all times to cover the opening 38 in operation. A door 40 is provided in plate 37 to permit access to the interior of the dryer. In operation inner cylinder 23 is rotated with outer cylinder 29 through members 28.

On the interior of cylinder 23, a plurality of straight lifters 41 are applied with the lifting sides thereof at an angle to the inner cylinder surface. Interspersed between the lifters 41 are a plurality of lifters 42 which are parallel to lifters 41, but extend beyond the ends of lifters 41 to the upper end of cylinder 23 in spiral form. These lifters are applied to the cylinder with the lifting surfaces at a different relative angle from the angle of lifters 21. To the exterior of cylinder 23, lifting and bracing angles 43 are applied. In the inner surface of cylinder 29, lifters 44 and 45 are applied to form different lifting angles with relation to the cylinder as shown in Fig. 8.

At its upper end cylinder 29 extends into an enlarged smoke box or chamber 46. Suitable seals are provided to permit rotation of 29 without leakage at this joint. A conveyor 47 driven by a sprocket 48 continuously removes the dried material from the bottom of chamber 46. The gases may pass directly out of 46 through passage 47 and up stack 48, as shown in Fig. 6, or through a settling tank as hereinafter described.

In operation of the plant so far described, for the production of meal the fuel from burner 13 is ignited and the openings 10 are regulated to admit an excess of air to the chamber. The air currents drawn through openings 10 contacting with the exterior of cylinder 6 are heated as they are drawn into the chamber, and at the end of cylinder 6 an excess supply of oxygen will mix thoroughly with and cause substantially complete combustion of fuel supplied through the burner. The completely consumed and hot gases of combustion are thoroughly mixed in the long chamber with excess air admitted through openings 10 in proper quantities. The mixing of excess air with the products of combustion in this chamber provides relatively large volumes of gases in which the combustible elements are completely consumed and the temperature of the mixture is lowered to a point where burning of the meal thereby is avoided. Where ports 14 are provided, the mixture of air and completely consumed gases may be further controlled by admitting cool air through these ports in properly regulated quantities to lower the temperature and further increase the volume of the heated gases. Complete consumption of the combustible elements in the gases of combustion is important in producing meal untainted by condensation of unconsumed elements from the fuel supply. By operation of the described arrangement as disclosed, meal without taint of this character is continuously produced. Where the checker work 22 is utilized this assists in the thorough mixing of the cool air and the hot gases of combustion. The mixture then passes by wall 20 into and through the inner cylinder 23 of the dryer, and the material to be dried is dropped back of wall 20 from chute 19 into the inner cylinder, and is in a protected zone from direct contact with the hottest gases until it has been advanced a distance along the inner cylinder. In this interval, the heat from cylinder 23 due to the passage of gases external thereto, and the heated gases in the cylinder cause generation of steam and due to the absorption of heat in vaporizing the moisture present in the material, the generation of steam will lower the temperature of the gases immediately surrounding the material and protect it from any slight tendency to burn or scorch which may exist. As the inner cylinder rotates, the material is carried upward in the pockets formed by the lifters and is showered downward through the currents of suitably hot and relatively dry gases. The differing angles of the lifters spread dumping points of the material and gives a more efficient showering thereof as it drops through the dryer, which results in intimate contacting of the particles with the heated gases and efficient drying. In addition to avoiding of taint by burning of the material, the addition of cool air to the completely consumed products of combustion is found to greatly increase the drying efficiency apparently because of the lower percentage of moisture required to be carried off in a given volume of air.

Due to the pitch of the cylinder 23 the material advances to the lower end thereof as it is showered through the heated currents of gases, and finally drops into the outer cylinder 29. As the gases leave the inner cylinder and pass into cylinder 29, the direction of flow is reversed and as the area is greater, the velocities are reduced. This results in the settling of a great percentage of particles carried in the currents. The material then travels back through the outer cylinder, being continually lifted by lifters 44 and 45 and showered through the currents of gases. As it drops it falls spread out on the exterior surface of inner cylinder 23 and is caught by members 43, finally dropping to the bottom, and again being carried upward until the lower end of cylinder 29 is reached, when thoroughly dried material drops into conveyor 47 and is continuously removed. The spreading of the material on the exterior of cylinder 23 further aids in the drying, and the arrangement of lifters is such as to continually shower the material through the heated air currents. A further reduction in velocity of gases and a change in direction of air currents occurs in chamber 46 causing further separation of the suspended meal or particles therefrom, and the gases finally pass out of stack 48.

Figure 12:
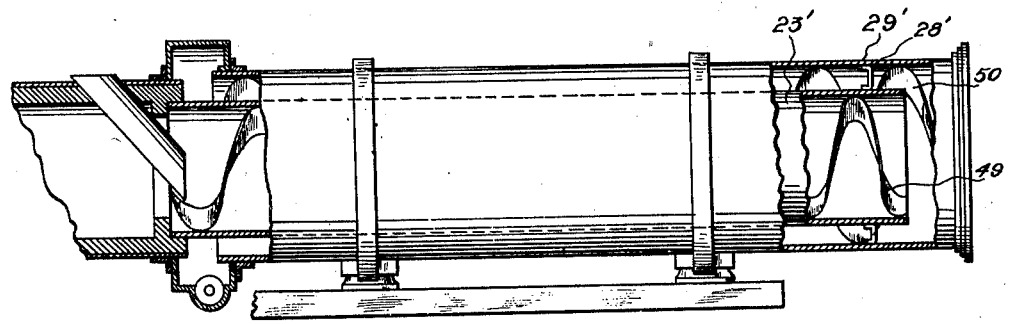
Fig. 12 is a view showing a modified dryer drum arrangement.

A modified form of arrangement for the dryer drums is shown in Fig. 12. In this form the inner drum 23' and outer drum 29' are horizontally arranged, and spirally applied lifters 49 and 50 are depended upon to feed the material through the drums. The special form of connections 28, and parts 24, 25 and 26 are eliminated, inner drum 23' being rigidly secured to and supported by the outer drum 29' by fixed supports or connections 28'. The remaining apparatus is the same as in the form heretofore described. Although not so efficient as the inclined cylinder apparatus heretofore described, because of the fact that the showering of material is largely lost, this form of dryer is operative at lower speeds when used in combination with the improved portable combustion chamber or equivalent arrangement mentioned.

With the arrangement heretofore described, it is found as hereinbefore mentioned, when treating fish meal, sand and like materials to produce foods, or fertilizer, that sufficient material is carried out of the stack to constitute a nuisance in certain localities. In these cases instead of joining member 47 directly to the stack, it may, as shown in Fig. 13, be passed into a large settling tank 51 with suitable baffle arrangements 52, and a clean out door 53. The velocity of the gases is here again reduced and the current directions changed to deposit further meal from the gases. From 51 the gases may pass through a suitable connection directly to a stack, or if further purification, or a mechanical draft is desired, they may be led through a decreaser 53' through suitable piping 54 to a mechanical suction or draft fan 55 of any well known construction, and then forced through piping 56 into a furnace or under a boiler to oxidize the fumes that remain.

It is found that material such as fish, from which the oil has been extracted, and which is passed through the dryer arrangements hereinbefore disclosed in the manner described, is free from taint due to condensed and unconsumed products of combustion, and is untainted by burning, so that it may be thereafter used for food for human beings. The product from fish waste may be used for cattle food or fertilizer. When treating diatomaceous earth, sand and other organic materials, taint by condensation of unconsumed products of combustion may be avoided and a high grade of product is produced. It will of course be understood in such cases that the draft may be regulated to permit higher temperatures of the gases as no taint due to burning of such materials will ordinarily be caused. Proper regulation of the fuel supply and draft may be made for the differing kinds of material treated. The method of supplying large volumes of relatively warm gases instead of smaller volumes of very hot gases is in practice found to increase the drying efficiency for organic and inorganic materials.

Having described and shown preferred embodiments of the invention, what is desired to be secured by Letters Patent and claimed as new is:

1. A dryer comprising a relatively long horizontal cylindrical combustion chamber, an internal cylindrical lining in said combustion chamber, a rotary dryer cylinder fitting into said lining, and an annular wall built in the end of said chamber in a manner to protect the end of said rotary dryer cylinder.

2. A dryer comprising a rotary drum, and a portable combustion chamber communicating with one end of said drum comprising a self-sustaining shell internally lined with a refractory material.

3. A dryer comprising a rotary cylindrical drum; and a combustion chamber removable and replaceable as a unit disposed at one end of said drum comprising a self-sustaining metallic shell lined with refractory material.

4. A drier comprising an outer rotatable drum; means for rotatably supporting said outer drum; means for rotating said outer drum; an inner drum rotatable with and supported solely from said outer drum and with one end thereof communicating with said outer drum; a combustion chamber adjacent the other end of said drum; means for feeding materials to be dried into said inner drum at the end thereof adjacent said combustion chamber; and a housing disposed between the end of said outer drum and said combustion chamber into which the gases and materials are discharged after having passed in opposite directions through said inner and outer drums.

5. The combination as set forth in claim 11 in which said supporting means for said outer drum are disposed intermediate the ends thereof and said housing is disposed between said supporting means for said outer drum and said combustion chamber.

6. The combination as set forth in claim 11 in which said combustion chamber is embodied in a self-sustaining unitary structure removable and replaceable as a unit from operative position with relation to said housing.

7. A drier comprising a rotary drum; and a portable combustion chamber comprising a self-sustaining metallic shell lined with refractory material for supplying heat to said drum, said combustion chamber being removable and replaceable as a unit with relation to said drum.

In testimony whereof, I affix my signature.

STANLEY HILLER.